United States Patent [19]

Pullen et al.

[11] Patent Number: 5,075,773
[45] Date of Patent: Dec. 24, 1991

[54] DATA TRANSMISSION IN ACTIVE PICTURE PERIOD

[75] Inventors: Ian R. Pullen, Surbiton; Charles P. Sandbank, Reigate, both of United Kingdom

[73] Assignee: British Broadcasting Corporation, London, England

[21] Appl. No.: 382,641

[22] PCT Filed: Dec. 5, 1988

[86] PCT No.: PCT/GB88/01059
§ 371 Date: Oct. 13, 1989
§ 102(e) Date: Oct. 13, 1989

[87] PCT Pub. No.: WO89/05555
PCT Pub. Date: Jun. 15, 1989

[30] Foreign Application Priority Data

Dec. 7, 1987 [GB] United Kingdom ............... 8728530
Dec. 11, 1987 [GB] United Kingdom ............... 8729000

[51] Int. Cl.⁵ ............................................. H04N 7/08
[52] U.S. Cl. ..................................... 358/141; 358/142
[58] Field of Search ............... 358/141, 142, 140, 11, 358/12, 174, 176, 146, 147, 83, 105

[56] References Cited

U.S. PATENT DOCUMENTS

| | | |
|---|---|---|
| 4,394,690 | 7/1983 | Kobayashi . |
| 4,556,906 | 12/1985 | Dischert . |
| 4,613,903 | 9/1986 | Nadan . |
| 4,672,425 | 6/1987 | Marie et al. . |
| 4,855,827 | 8/1989 | Best ............................... 358/142 |
| 4,931,855 | 6/1990 | Salvadorini ............... 358/105 X |
| 4,959,717 | 9/1990 | Faroudja ..................... 358/37 X |

FOREIGN PATENT DOCUMENTS

0113933 7/1984 European Pat. Off. .
0237174 9/1987 European Pat. Off. .
2481554 10/1981 France .
2188510A 2/1987 United Kingdom .

OTHER PUBLICATIONS

"6-MHz Single-Channel HDTV Systems", Schrieber; HDTV Symposium at Ottawa, Oct. '87, pp. 1-7.

*Primary Examiner*—Victor R. Kostak
*Attorney, Agent, or Firm*—Robert F. O'Connell

[57] ABSTRACT

A method and apparatus for transmitting extended aspect ratio pictures is described. The transmitted pictures can be viewed on an extended aspect ratio high definition screen but can also be viewed on a reduced number of lines on a conventional receiver. The lines not used in the picture viewed on the conventional receiver contain non-visible data relating to picture information. The transmitter comprises a high definition television (HDTV) camera (42) providing a high definition video signal to a standards down-convertor (44). This has a video output with a reduced number of lines coupled to a frame store (46) and a data output connected to a buffer (48). Means (54) combines the data from the buffer (48) with the video signal from the frame store (46). A controller (50) responsive to synchronizing information ensures that the data is combined with blank portions of the video signal. The combined signal is then fed to transmitter (53). At an HDTV receiver the front end circuitry (54) receives the video signal. A switch (56) under the control of a data/video detector (58) selects between sending video information to a frame store (60) and sending data to a standards up-converter (64). The data is used to enhance picture information from the frame store (64), the resultant picture being displayed on an HDTV display.

17 Claims, 5 Drawing Sheets 5,075,773

DATA TRANSMISSION IN ACTIVE PICTURE PERIOD

BACKGROUND OF THE INVENTION

This invention relates to the transmission of additional data in the active picture period of video transmissions for example such as broadcast television transmission.

Digitally assisted television (DATV) has been proposed which uses additional data transmitted with a video signal to enhance the display at the receiver and thereby produce, for example, a high definition television (HDTV) picture or some other enhanced display.

It is proposed that HDTV receivers will typically operate with a larger aspect ratio, namely the ratio of picture width to picture height, than that used with conventional receivers operating, for example, on 625 lines. Since conventional receivers are not compatible with a full bandwidth HDTV signal a method of transmitting signals which can be received on both types of receiver is needed.

A system for use with both HDTV receivers and conventional receivers is described in U.S. Pat. No. 4,613,903. This uses a high resolution TV camera to provide two transmission signals. The first of these is compatible with a conventional receiver. This signal includes the sum average of two of the HDTV fields in a first field and the remaining HDTV field in a second field. The second signal contains the remaining HDTV information. An HDTV receiver uses both transmitted signals to reconstruct an HDTV signal.

U.S. Pat. No. 4,672,425 proposes transmitting data in the active picture period of a conventional transmission and using this data to produce an extended aspect ratio picture on a non-conventional receiver. However, since the data is in the active picture period it is visible on the conventional receiver.

SUMMARY OF THE INVENTION

According to one aspect of the present invention there is provided a method of transmitting extended aspect ratio pictures in a video signal comprising the steps of, providing a video signal in which picture information occupies a smaller number of lines than the number required to fill the visible area of a conventional receiver, inserting additional data into at least some of the lines not used for picture information, the data being at a sufficiently low level to be substantially invisible when viewed on a conventional receiver, and transmitting the picture information and data as a conventional video signal.

According to another aspect of the present invention there is provided a method of transmitting additional data in a video signal comprising the steps of providing a video signal in which picture information occupies less than the whole visible area of a conventional receiver, inserting additional data into at least part of the area not used for picture information, the data being at a sufficiently low level to be substantially invisible when viewed on a conventional receiver, and transmitting the picture information and data as a conventional video signal.

The present invention also provides apparatus to transmit additional data in a video signal comprising means to provide a first video signal with a first number of lines, means to convert the signal to a second video signal on a reduced number of lines together with data relating to the difference between the two signals, first storage means coupled to a second video signal output of the conversion means, second storage means coupled to a data output of the conversion means, combining means coupled to the outputs of the first and second storage means and with an output coupled to the input of a transmitter means, to combine the stored video and data, the data being at a sufficiently low level to be substantially invisible when viewed on a conventional receiver, and control means coupled to the first and second storage means and having a timing information input, to determine whether video signal information from the first storage means or data from the second storage means is available at the combining means inputs.

Another aspect of the invention provides apparatus to receive a video signal containing additional data within the active picture area, the data being at a sufficiently low level to be substantially invisible when viewed on a conventional receiver, the apparatus comprising input means to receive the said video signal, switching means responsive to the received signal to switch between a picture output and a data output, storage means to store received picture information under the control of timing information within the said picture information, conversion means coupled to an output of the storage means and to the data output of the switching means to receive picture information from the storage means and to enhance that picture information by generating additional lines of video signal relating to the received additional data, and display means to display the enhanced picture.

BRIEF DESCRIPTION OF THE DRAWINGS

The present invention is defined in the appended claims to which reference should now be made.

The invention will now be described in more detail by way of example with reference to the drawings, in which.

DETAILED DESCRIPTION OF PREFERRED EMBODIMENTS

Figure 1:
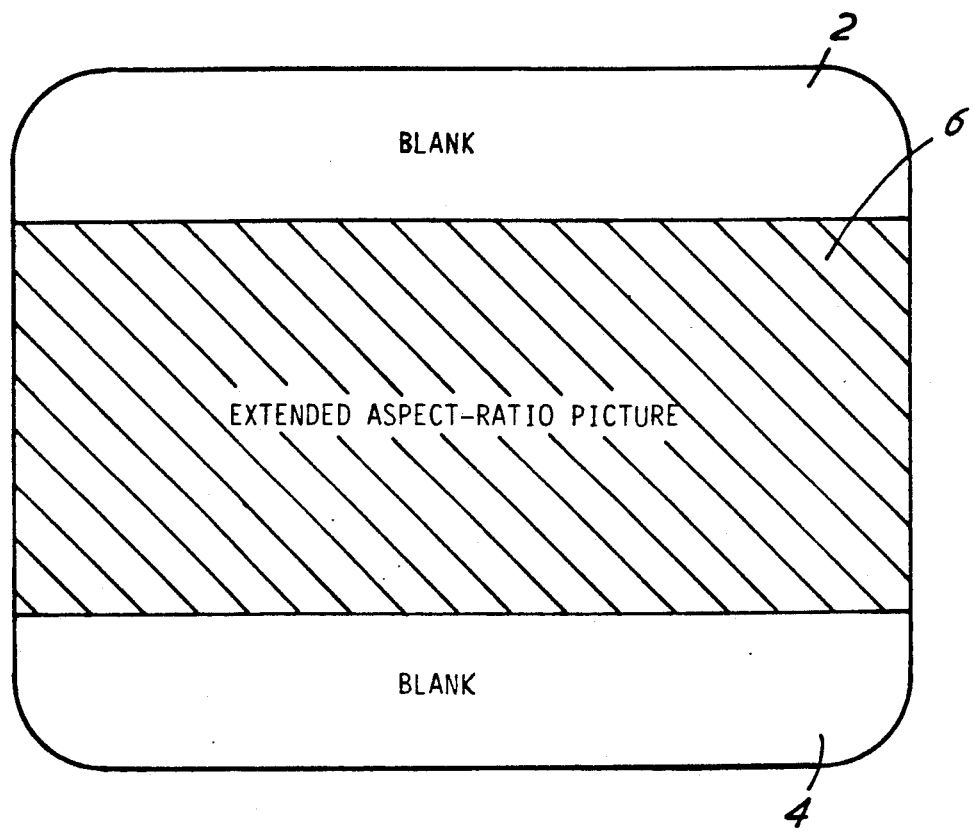
FIG. 1 shows an extended aspect ratio picture displayed on a conventional screen.

When a wide aspect ratio picture is transmitted, clearly a conventional receiver will need to show some representation of it. One way of achieving this is shown in FIG. 1. The top 2 and bottom 4 portions of the screen are not used and appear black, and the picture occupies the central portion 6.

Figure 2A:
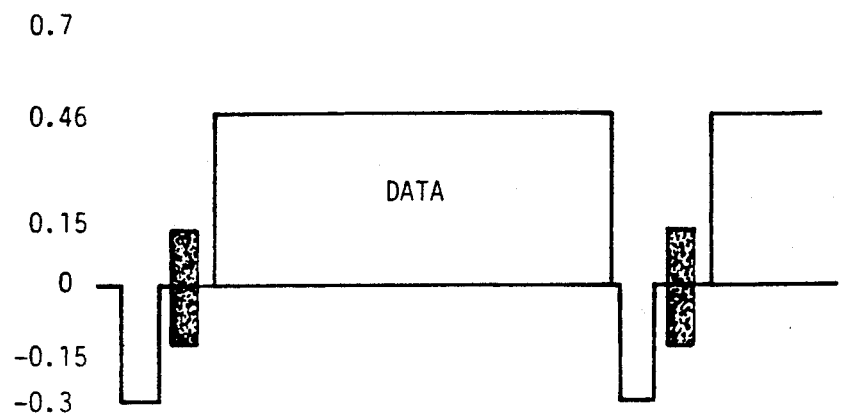
FIGS. 2a and 2b show conventional teletext data and the proposal DATV data format embodying the invention within a picture line.

The lines in the blank areas 2 and 4 would now be free to carry other data such as DATV data. However, these free lines are in the visible picture area of a conventional receiver. We have appreciated that it would be highly advantageous to be able to transmit the DATV data in a format which is not easily visible on a conventional receiver and which also does not interfere with the operation of the receiver. For example, the format used for teletext information might be considered. The teletext data levels with respect to black level are shown in FIG. 2(a). With standard one volt video the logic levels used for teletext are 0 V and 0.46 V with respect to black level. Thus, if this format is used to transmit data in the blank areas 2 and 4 of a conventional screen, unacceptable patterning will occur. The invention therefore aims to provide data formats which would appear black on a conventional receiver.

We have found that if lower logic levels are used data can then in fact be transmitted in the active picture area without "noisy" effects appearing on the display. The levels should preferably be mostly at or below black level. The signals should also not interfere with the receiver synchronising circuits. One method of ensuring this is to make sure that the sync. circuits see the data as a line of black. This is done by positioning the data levels above and below black so that the mean level is black. This means, however, that the level will go above black level at times. The gamma characteristic of the television tube will, however, ensure that no excessive visibility of the data occurs, provided the data amplitude is not too great.

The logic levels V1 and V0 can therefore be written as:

$$V1 = 0 + V$$

$$V0 = 0 - V$$

Where:

0 = Black level = Mean level of digital signal.

2 V = Total peak to peak amplitude of data waveform.

Figure 2B:
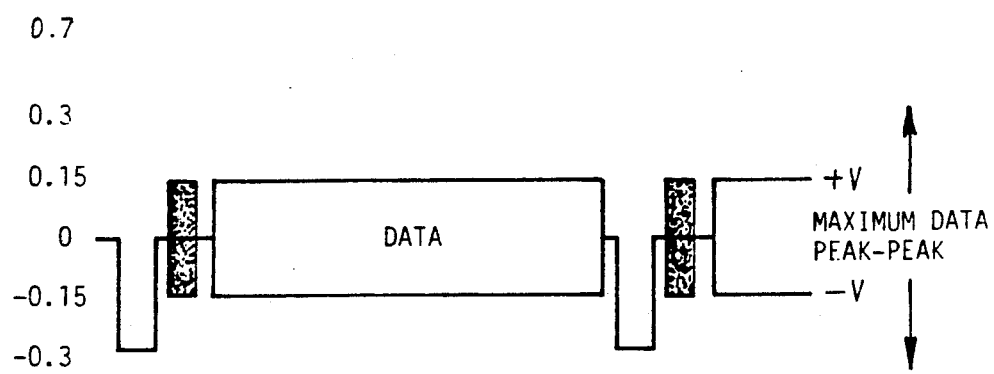

FIG. 2(b) shows the total available voltage swing of 0.6 V available for the DATV data; however, if the signal is to remain invisible the total swing cannot be used.

The bit-rate used determines the data capacity provided by each television line, as well as the required channel filtering and required signal to noise ratio. Before specifying the bit rate it is, therefore, ideally necessary to know the required data capacity as well as the service area and the number of lines available for data transmission. The latter is, of course, set by the aspect ratio of the picture. In addition the precise relationship between bit rate and line frequency will have a significant bearing on the appearance of the data if it should be visible. For the purpose of this embodiment a bit rate of around 5.5 MBit/sec is used for NRZ (Non Return to Zero) transmission since with 100% cosine filtering This will conveniently fit within the 5.5 MHz vision bandwidth. Some "Fine-Tuning" has been undertaken to try to minimise the visibility of the data on the screen. This has resulted in a value of 5.50104 MBit/sec, which gives a noise-like appearance with little visible patterning. The bit rate for Bi-Phase transmission is half of this value (2.75052 MBit/sec). Bi-Phase transmission has two transmission bits to transmit each data bit but ensures that the mean of the transmission bits is automatically zero.

The spectrum of the data signal has a bearing on its visibility. Furthermore, low frequency components around line frequency may cause shifting of the DC level across a line between clamping pulses. This could give rise to a visible streaking effect as well as a reduction of eye-height, and possible sync problems. For this reason several types of data spectrum have been tested:
a) 32,767 Bit pseudo-random sequence NRZ
b) 32,767 Bit pseudo-random sequence BI-PHASE
c) 127 Bit pseudo-random sequence NRZ
d) 127 Bit pseudo-random sequence BI-PHASE.

All four data signals have been inserted at several values of peak to peak amplitude in an experimental arrangement. The mean DC level of the signal was set to black level and tests have been carried out at other D.C. levels to enable the amplitude of the signal to be set higher.

The data in the tests was inserted in the following lines at the top and bottom of the screen:

| Lines | | |
|---|---|---|
| | 23-75 Top | Field 1 |
| | 267-310 Bottom | Field 1 |
| | 336-388 Top | Field 2 |
| | 580-623 Bottom | Field 2 |

The picture information in the lines in the centre of the screen consists of colour bars for the experimental set up.

Figure 3:
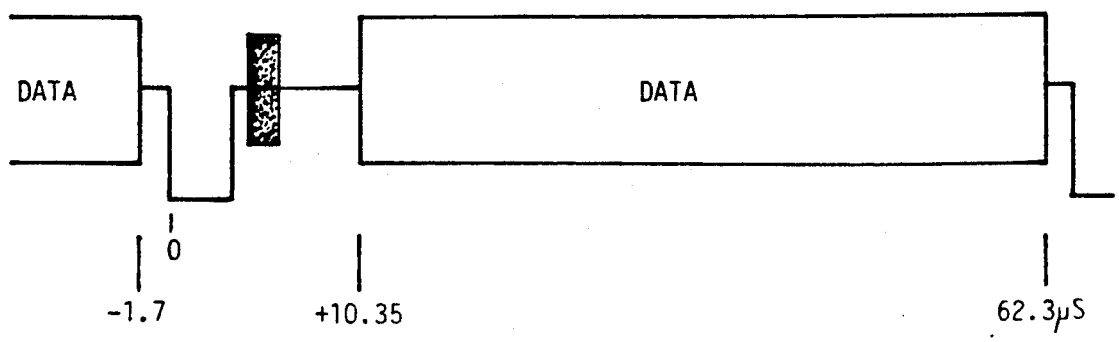
FIG. 3 shows the proposed DATV data timings in an embodiment of the invention.

It is necessary to leave the colour bursts in the data lines in order to avoid incorrect operation giving rise to a colour flashing effect at the top of the active picture. To provide for this, the data is disabled during line blanking, and thus extends from 10.35 us after the leading edge of syncs to 1.7 s before the next sync as shown in FIG. 3.

The above figures relate to a conventional 625/50 PAL signal as is broadcast in the United Kingdom, having a line period of 64 us.

Figure 4:
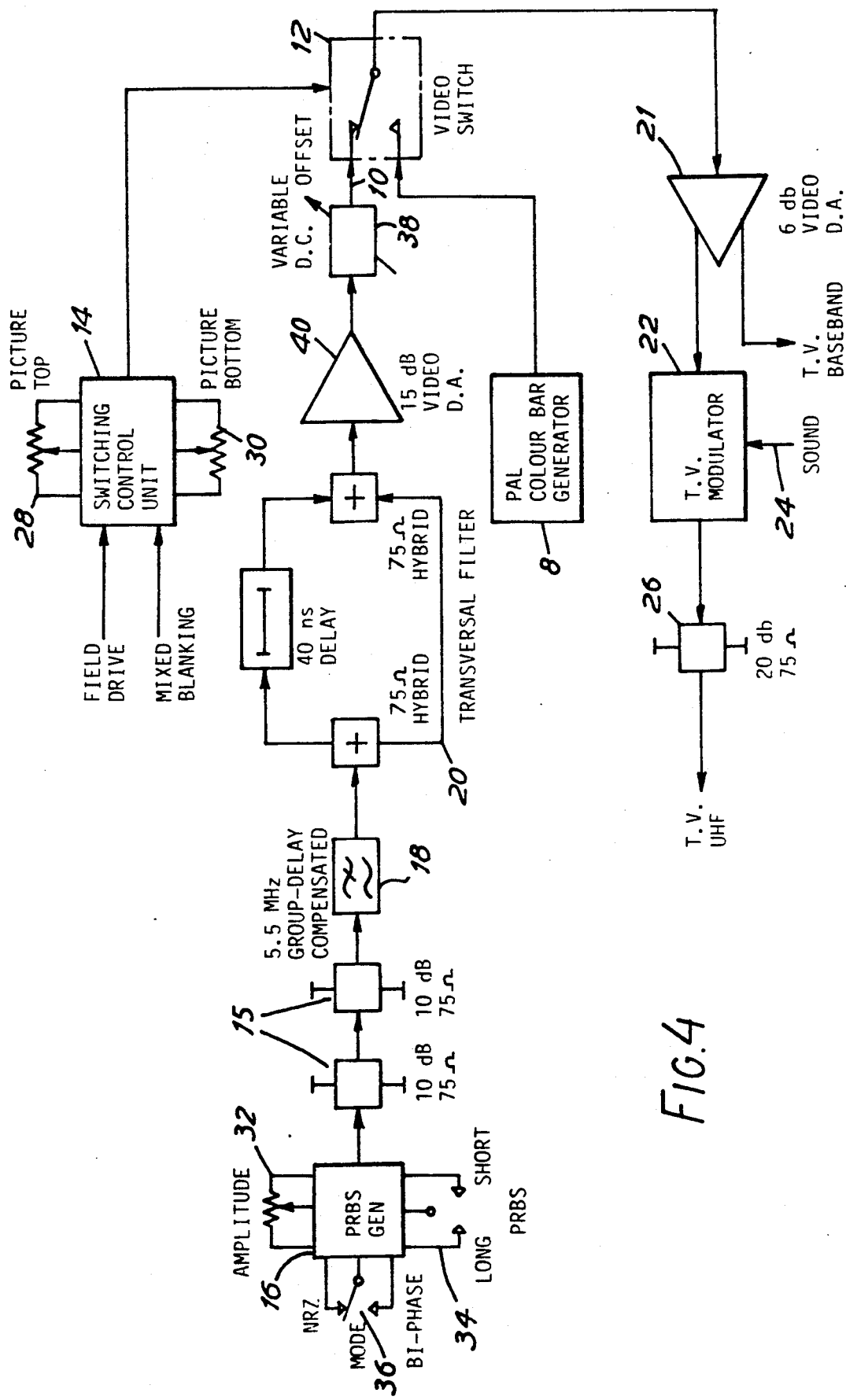
FIG. 4 shows an experimental set up to test the system.

FIG. 4 shows the experimental set-up used. A video source 8 and the appropriate data signal 10 are applied to a video switch 12. A switching control unit 14 generates appropriate switching signals so that the data is switched into the video waveform as required. The data is generated by a pseudo-random binary sequence generator circuit 16 which produces a square-wave "Boxcar" output after passing through attenuators 15. This is suitably low-pass filtered by a 5.5 MHz group-delay corrected filter 18. For the purpose of this investigation the data shaping is not a precise cosine law. An approximate shaping is achieved using a simple transversal filter 20 with a delay selected expertimentally to produce an optimum eye display when viewed on an oscilloscope.

The composite video/data waveform is passed through an amplifier 21 to a television modulator 22 and modulated to channel E64 and then attenuated by an attenuator 26 the output of which is then fed at a level of −42 dBm to a Ferguson TX10 receiver uhf input. Sound signals 24 are also fed into the modulator so that any impairment to the sound from the receiver can be assessed.

A number of adjustments allow the experimental conditions to be varied as appropriate. The positions on the screen of the transitions between data and picture are adjustable by means of "Picture Top" and "Picture Bottom" controls 28 and 30 on the switching control unit. Similarly the PRBS generator provides controls 32, 34 and 36 for the data amplitude, sequence length, and data type (NRZ or Bi-Phase) respectively. A variable DC offset 38 is provided to enable the mean DC level of the data to be varied after passing through a differential amplifier 40.

Data waveforms centred on black level appear to be the most suitable for insertion into blank lines. Four values of peak to peak data amplitude have been tried:
a) 0.3 V (colour burst amplitude)
b) 0.4 V
c) 0.5 V
d) 0.6 V.

The uhf signals have been applied to a TX10 receiver with its controls set to normal viewing positions. The resulting picture was viewed at a distance of about 1 meter in a darkened room. For all the test cases tried an assessment was made of:
a) The visibility of the data waveform on the blanked off part of the screen, expressed as an approximate grade on a CCIR 5-point impairment scale (see Appendix).
b) The extent of any synchronisation problems, and whether or not data can be inserted in field blanking.
c) Any impairments to the active picture area.
d) Any impairments to the sound.

The results are set out in TABLE 1 below,

TABLE 1

| Peak-peak amplitude of data (V) | | 0.3 | 0.4 | 0.5 | 0.6 |
|---|---|---|---|---|---|
| 32767-Bit sequence NRZ | Visibility of data | 4 | 2.5 | 2 | 1 |
| | Sync Stability | O.K. | O.K. | O.K. | O.K. |
| 32767-Bit sequence Bi-Phase | Visibility of data | 4 | 3 | 2 | 1 |
| | Sync Stability | O.K. | O.K. | O.K. | O.K. |
| 127-Bit sequence NRZ | Visibility of data | 3 | 1 | 1 | 1 |
| | Sync Stability | O.K. | O.K. | O.K. | O.K. |
| 127-Bit sequence Bi-Phase | Visibility of data | 4 | 2 | 1 | 1 |
| | Sync Stability | O.K. | O.K. | O.K. | O.K. |

No impairments to sound or active picture were perceptible for any of the test cases.

NRZ or Bi-phase data can therefore, be inserted into television lines with a peak to peak amplitude of 0.3 V with no impairment to existing sound or vision although it is slightly visible. The above tests were, however, conducted in a darkened room. In normal lighting conditions the 0.3 V data waveform is virtually invisible, and Bi-phase data is still invisible at 0.4 V peak to peak.

A further test has been carried out involving setting the data amplitude to zero and increasing it until it becomes visible. As before the experiment was conducted in a darkened room. It was found that on the TX10 receiver, in order to be completely invisible the amplitude of the data must be no greater than 0.16 V (0.08 V above and below black level). The same result was obtained with both pseudo-random sequences, NRZ and Bi-phase. Furthermore, on a JVC portable monitor receiver the amplitude needs to be 0.1 V (0.05 V above and below black level).

From this it seems that although a reasonable data amplitude can be used in normal viewing conditions, in a darkened room the amplitude must be reduced to 0.1 V if it is to be completely invisible on the two receivers tried with the data centred on black level.

The use of data waveforms with the mean DC level below black level has been tested with three domestic receivers.
a) A Ferguson TX10
b) A JVC Portable Receiver/Monitor Model CX6 10GB
c) A Decca Receiver/Monitor Model CS2645/AL.

With all three receivers it has been found that:
i) The top of the waveform excursions is limited by the degree of visibility
ii) The bottom of the waveform excursions is limited by failure of the receiver synchronising circuits.

In order to find the absolute maximum data amplitude that can be inserted, the top and bottom excursions of the data were independently varied until the expected impairments just started to appear. This procedure was repeated for the short and long pseudorandom sequences with NRZ and Bi-Phase on each of the television receivers. For completeness the tests have been carried out with the signals modulated onto a uhf carrier and fed to the aerial input, and using baseband (unmodulated) video signals fed to the baseband inputs. It is, of course, the uhf results that are of most significance. The results are summarised in TABLE 2, below:

TABLE 2

| Mode | Sequence | Data | Top Limit (Visibility) | Bottom Limit (Syncs) |
|---|---|---|---|---|
| TX10 RECEIVER | | | | |
| UHF | 32767 Bit | NRZ | 0.08 | −0.20 |
| | | Bi−Phase | 0.08 | −0.26 |
| | 127 Bit | NRZ | 0.07 | −0.21 |
| | | Bi−Phase | 0.07 | −0.26 |
| BASEBAND | 32767 Bit | NRZ | 0.06 | −0.24 |
| | | Bi−Phase | 0.08 | −0.28 |
| | 127 Bit | NRZ | 0.05 | −0.25 |
| | | Bi−Phase | 0.07 | −0.28 |
| JVC RECEIVER | | | | |
| UHF | 32767 | NRZ | 0.11 | −0.19 |
| | | Bi−Phase | 0.08 | −0.3 |
| | 127 Bit | NRZ | 0.11 | −0.19 |
| | | Bi−Phase | 0.08 | −0.3 |
| BASEBAND | 32767 | NRZ | 0.08 | −0.22 |
| | | Bi−Phase | 0.04 | −0.31 |
| | 127 Bit | NRZ | 0.08 | −0.22 |
| | | Bi−Phase | 0.03 | −0.32 |
| DECCA RECEIVER/MONITOR | | | | |
| UHF | 32767 Bit | NRZ | 0.22 | −0.19 |
| | | Bi−Phase | 0.19 | −0.29 |
| | 127 Bit | NRZ | 0.22 | −0.19 |
| | | Bi−Phase | 0.19 | −0.29 |
| BASEBAND | 32767 Bit | NRZ | 0.26 | −0.19 |
| | | Bi−Phase | 0.26 | −0.29 |
| | 127 Bit | NRZ | 0.26 | −0.19 |
| | | Bi−Phase | 0.26 | −0.29 |

Therefore, for the sample receivers tested the maximum data signals that can be inserted are:
NRZ long sequence: −0.19 to 0.08 V (Peak-Peak=0.27 V)
NRZ short sequence: −0.19 to 0.07 V (Peak-Peak=0.26 V)
Bi-Phase long sequence: −0.26 to 0.08 V (Peak-Peak=0.34 V)
Bi-Phase short sequence: −0.26 to 0.07 V (Peak-Peak=0.33 V)

From the point of view of sync stability all three receivers perform much the same. Even the Decca receiver which is of fairly old design is not significantly less tolerant to data signals than the two modern sets. In the case of the visibility of data above black level the TX10 starts to show signals at only 0.07 V, whereas the Decca receiver can take NRZ up to 0.22 V without it showing up. This can be explained by the higher brightness of the modern PIL tube in the TX10 compared with that of the old delta tube in the Decca receiver.

The sync stability seems, in general, to be worse with uhf signals. The visibility is generally better with uhf signals.

The optimum form of the data transmitted in the picture area depends on the requirements of the transmission system on which it is to be used. If the mean DC level of the signal is not allowed to fall below black level, as would be the case in a normal TV line, a peak to peak data amplitude of 0.1 V is recommended. If the noise immunity of such signals is found to be insufficient the amplitude of the signal could be increased although this would result in it being visible on some receivers. An amplitude of around 0.3 V is about the maximum before the data signals become annoying in normal viewing conditions. NRZ data can be used in this case, there is no advantage with using Bi-Phase.

All receivers tested, however, will tolerate a mean DC level below black level. If this is allowable from the point of view of the transmission system a NRZ signal between $-0.19$ V and 0.07 V should be possible, providing an amplitude of 0.26 V. It is recommended, however, that if possible Bi-Phase coding is used. This does not prove as disturbing to receiver sync circuits and allows the lower level to be set to $-0.26$ V providing an amplitude of 0.33 V. This, of course, depends on whether the proposed aspect ratio allows for sufficient data lines to be able to stand the resulting reduction in bit rate.

The above data amplitudes are less than the 0.46 V amplitude of the Teletext system. Although the data rate is different from that used for these tests, early work on Teletext has shown very little difference in noise performance over the range 4.5 MBit/s to 6.875 MBit/s. Consequently results obtained for Teletext may for the present be used to estimate the expected noise margins with the new DATV signal. Field tests on Teletext suggest that failure occurs when the ratio of picture to RMS noise is around 23 dB. From this it may be deduced that the proposed DATV data should fail at about 28 dB. For an acceptable television picture it is necessary to achieve a signal to noise ratio of at least 30 dB, so from this point of view the 0.26 V amplitude should be sufficient. Furthermore, the limit of service area criterion of 64 dB(uV/m) for band 4 and 70 dB(uV/m) for band 5 should achieve a picture to noise ratio of at least 34 dB depending on the receiver. This then implies a margin of about 6 dB in favour of the DATV signal.

In a real transmitter, an arrangement similar to FIG. 4 could be used. Instead of a pseudo random binary sequence generator 16, a source of real data would be used, in the case of a DATV transmission this would initially be extracted from picture information. The PAL colour bar generator 8 would be replaced by a video signal and the transmitter would be switched between video and data by the video switch 12 under control of the switching control unit 14.

The video signal used by such a transmitter should ideally be generated from an HDTV video signal. It should then be down-converted to reduce the number of active lines to less than the 576 active lines of a conventional 625 line video signal, for example 450 active lines.

Figure 5:
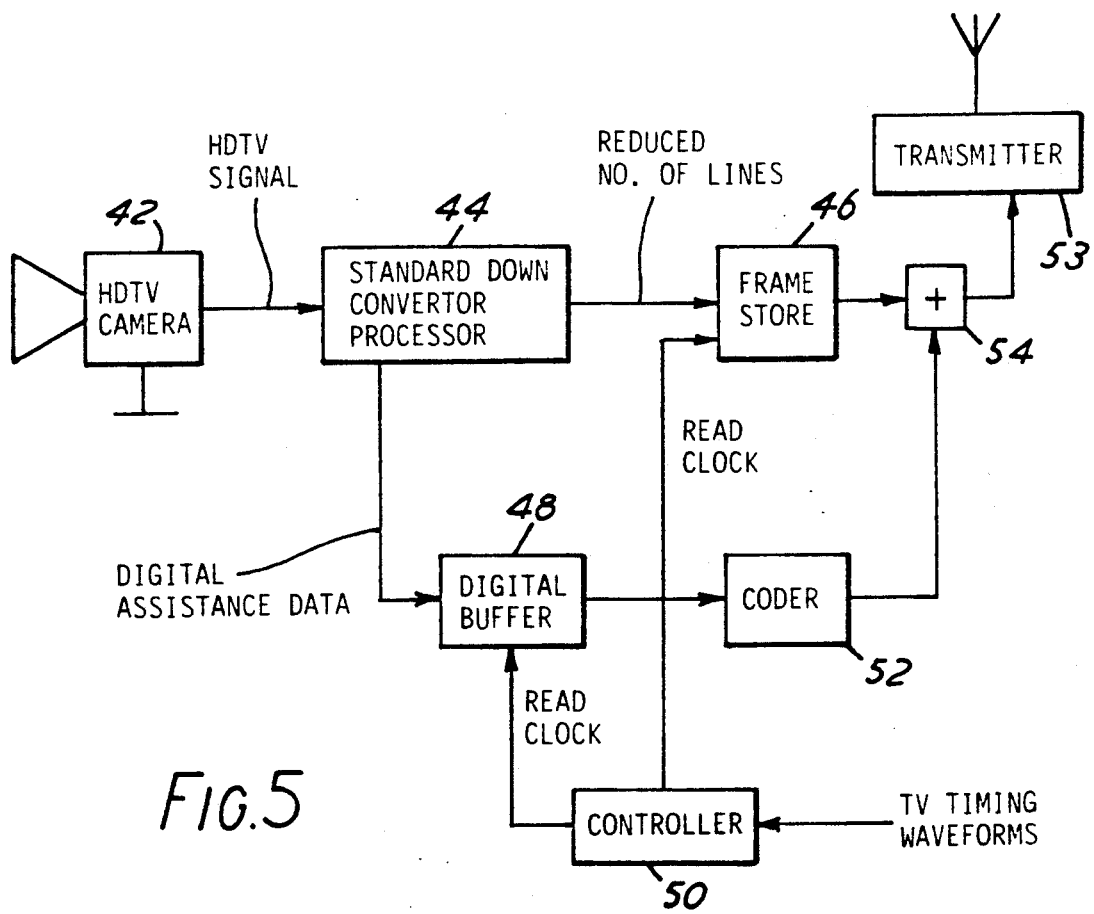
FIG. 5 shows a block diagram of a transmitter embodying the invention.

In FIG. 5 a block diagram of a proposed transmitter embodying the invention is shown. An HDTV camera 42 produces an HDTV signal which forms the input to a standards down-converter processor 44. This processor has two outputs. The first output produces picture information on a reduced number of lines (e.g. less than 576 active picture lines for reception on conventional 625 line receivers) and this forms the input to a frame store 46. The second output produces digital assistance data for use by HDTV receivers to regenerate the HDTV signal. This data is read into a digital buffer 48.

TV timing and synchronising waveforms form the input to a controller 50 for the transmitter. The clock outputs of the controller enable and disable buffer 48. The output data of the digital buffer is coded by a coder 52 which converts it to a form suitable for transmission in the active picture period. This data and the picture data output by the frame store are then combined in an adder 54, the combination resulting in either output of picture data or output of coded digital assistance data. This is determined by the enabling and disabling of the frame store 46 and digital buffer 48 output by the controller 50 clock. The output signal is the input to a transmitter 53.

The timing information supplied to the controller 50 is conventional 625 line timing information. The controller preferably enables and disables the outputs of the frame store 46 and the digital buffer 48 so that a picture for reception on a conventional receiver is transmitted in the letterbox type format illustrated in FIG. 1 and the DATV data invisibly occupies the blank parts of the screen.

Figure 6:
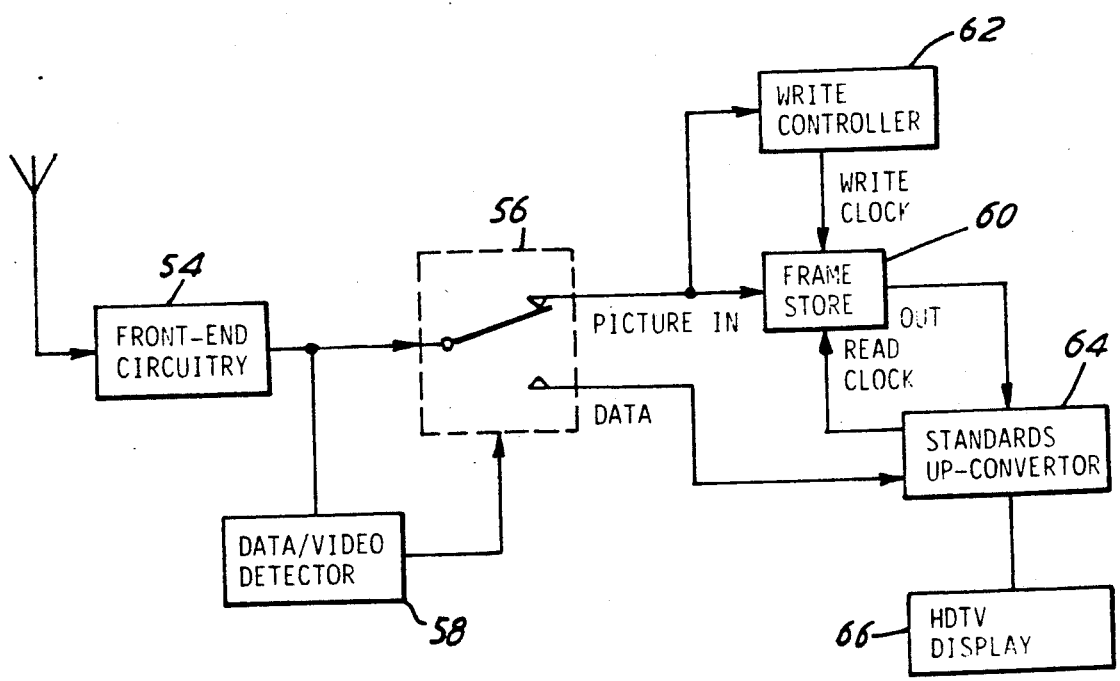
FIG. 6 shows a block diagram of a receiver embodying the invention.

An HDTV receiver which is compatible with a signal transmitted by the system in FIG. 5 is shown in FIG. 6. The receiver has conventional front end circuitry 54 receiving the signal. The output of this circuitry forms the inputs to a data/video switch 56 under the control of a data/video detector 58 which is also connected to the output of the front end circuitry.

When a signal is received, the data/video switch automatically switches between data and video outputs as either data or video respectively is detected in the incoming signal by the data/video detector 58.

The picture output of the data/video switch 56 forms the input to a frame store 60 and also supplies timing information to a write controller 62, the output of which controls the storing of picture lines in the frame store 60. The data output of the data/video switch forms one of the inputs to a standards up-converter 64, the other input being the output of the frame store 60. A clock output from the standards up-converter 64 is used to enable the output of the frame store to release picture information for up-conversion to an HDTV signal with the DATV data. This HDTV signal can then be viewed on an HDTV display 66.

The above method of transmitting and receiving additional data with extended aspect ratio receivers is intended to be used with any transmission standard. The main advantage is that pictures can be transmitted over the same transmission channels as are currently in use and can still be received on conventional receivers.

APPENDIX

CCIR 5-POINT IMPAIRMENT SCALE

5. IMPERCEPTIBLE
4. PERCEPTIBLE BUT NOT ANNOYING
3. SLIGHTLY ANNOYING
2. ANNOYING
1. VERY ANNOYING.

We claims:

1. A method of transmitting extended aspect ratio pictures in a video signal comprising the steps of providing a video signal in which picture information (6) occupies a smaller number of lines than the number required to fill the visible area of a conventional receiver, inserting additional data into at least some of the lines (2,4) not used for picture information, the data being at a sufficiently low level to be substantially invisible when viewed on a conventional receiver, and transmitting the picture information and data as a conventional video signal.

2. A method according to claim 1 in which the additional data is inserted between consecutive line blanking periods.

3. A method according to claim 1 or 2 in which the additional data is inserted at a mean D.C. level which is substantially at black level.

4. A method according to claim 3 in which the additional data is inserted with a ratio of peak-to-peak amplitudes to the video signal no greater than 0.3:1.

5. A method according to claim 1 or 2 in which the additional data is inserted at a mean D.C. level which is below black level.

6. A method according to claim 5 in which the additional data is inserted as non-return-to-zero data.

7. A method according to claim 1 or 2 in which the additional data is inserted as Bi-phase data.

8. A method according to claim 1 in which the additional data is digital data.

9. A method according to claim 1 in which the additional data is data to enhance display quality on HDTV receivers.

10. A method of transmitting additional data in a video signal comprising the steps of providing a video signal in which picture information occupies less than the whole visible area of a conventional receiver, inserting additional data into at least part of the area not used for picture information, the data being at a sufficiently low level to be substantially invisible when viewed on a conventional receiver, and transmitting the picture information and data as a conventional video signal.

11. A method according to claim 10 in which the additional data is inserted at a mean D.C. level which is substantially at black level.

12. A method according to claim 10 in which the additional data is inserted at a mean D.C. level which is below black level.

13. Apparatus to transmit additional data in a video signal comprising means (42) to provide a first video signal with a first number of lines, means (44) to convert the signal to a second video signal with a reduced number of lines together with data relating to the difference between the two signals, first storage (46) means coupled to a video signal output of the conversion means, second storage means (48, 52) coupled to a data output of the conversion means, combining means (54) coupled to the outputs of the first and second storage means and with an output coupled to the input of a transmitter means (53), to combine the stored video and data, the data being at a sufficiently low level to be substantially invisible when viewed on a conventional receiver and control means (50) coupled to the first and second storage means and having a timing information input, to determine whether video signal information from the first storage means or data from the second storage means is available at the combining means inputs.

14. Apparatus according to claim 13 in which the first video signal is a high definition (HDTV) signal.

15. Apparatus according to claim 13 or 14 in which the data relating to the difference between the two signals is digital assistance data.

16. Apparatus according to claim 13 in which the transmitted signal is a 625 line video signal.

17. Apparatus to receive a video signal containing additional data within the active picture area, the data being at a sufficiently low level to be substantially invisible when viewed on a conventional receiver, the apparatus comprising input means (54) to receive the said video signal, switching means (56) responsive to the received signal to switch between a picture output and a data output, storage means (60) to store received picture information under the control of timing information within the said picture information, conversion means (64) coupled to an output of the storage means and to the data output of the switching means to receive picture information from the storage means and to enhance that picture information by generating additional lines of video signal relating to the received additional data, and display means (66) to display the enhanced picture.

* * * * *